United States Patent [19]

Kötz et al.

[11] Patent Number: 4,839,007

[45] Date of Patent: Jun. 13, 1989

[54] METHOD FOR PURIFYING INDUSTRIAL WASTE WATER BY DIRECT OXIDATION OF THE ORGANIC POLLUTANTS

[75] Inventors: Rüdiger Kötz, Unterehrendingen; Claus Schüler, Widen; Samuel Stucki, Nussbaumen, all of Switzerland

[73] Assignee: BBC Brown Boveri AG, Baden, Switzerland

[21] Appl. No.: 156,890

[22] Filed: Feb. 17, 1988

[30] Foreign Application Priority Data

Feb. 20, 1987 [CH] Switzerland ............................ 660/87

[51] Int. Cl.$^4$ ................................................ C02F 1/46
[52] U.S. Cl. ................................. 204/149; 204/290 F; 204/291; 210/748
[58] Field of Search ............... 204/149, 290 R, 290 F, 204/291, 150; 210/748

[56] References Cited

U.S. PATENT DOCUMENTS

| | | | |
|---|---|---|---|
| 3,977,959 | 8/1976 | Habermann et al. | ............... 204/293 |
| 4,028,215 | 6/1977 | Lewis et al. | ...................... 204/290 F |
| 4,208,450 | 6/1980 | Lewis et al. | ....................... 427/126.3 |

FOREIGN PATENT DOCUMENTS 0153586  9/1985  European Pat. Off. .

OTHER PUBLICATIONS

Kuhn, "The Electrochemical Treatment of Aqueous Effluent Streams"; *Electrochemistry of Cleaner Environments*, New York, 1972, pp. 98 +30.
"Technological Impact of Metallic Oxides of Anodes"; *Electrodes of Conductive Metallic Oxides* (Part B); New York, 1981; pp. 627–659.

*Primary Examiner*—John F. Niebling
*Assistant Examiner*—Kathryn Gorgos
*Attorney, Agent, or Firm*—Oblon, Spivak, McClelland, Maier & Neustadt

[57] ABSTRACT

A method for purifying industrial waste water by direct oxidation of the organic pollutants in an electrochemical cell the anode of which contains, in its active part or in any intermediate layer present, neither noble metals in any form nor $PbO_2$ nor graphite, but instead comprises in this part exclusively $SnO_2$ which is doped with F, Cl, Sb, Mo, W, Nb, Ta or with a mixture of at least two of these elements. The anode has an oxygen overvoltage which is higher than that of a $PbO_2$ comparison anode and reaches the value of at least 1.85 V at a current density of 0.1 mA/cm$^2$ in 1 normal $H_2SO_4$ under a pressure of 1 bar at a temperature of 20° C. in the presence of a Pt counterelectrode.

9 Claims, 1 Drawing Sheet

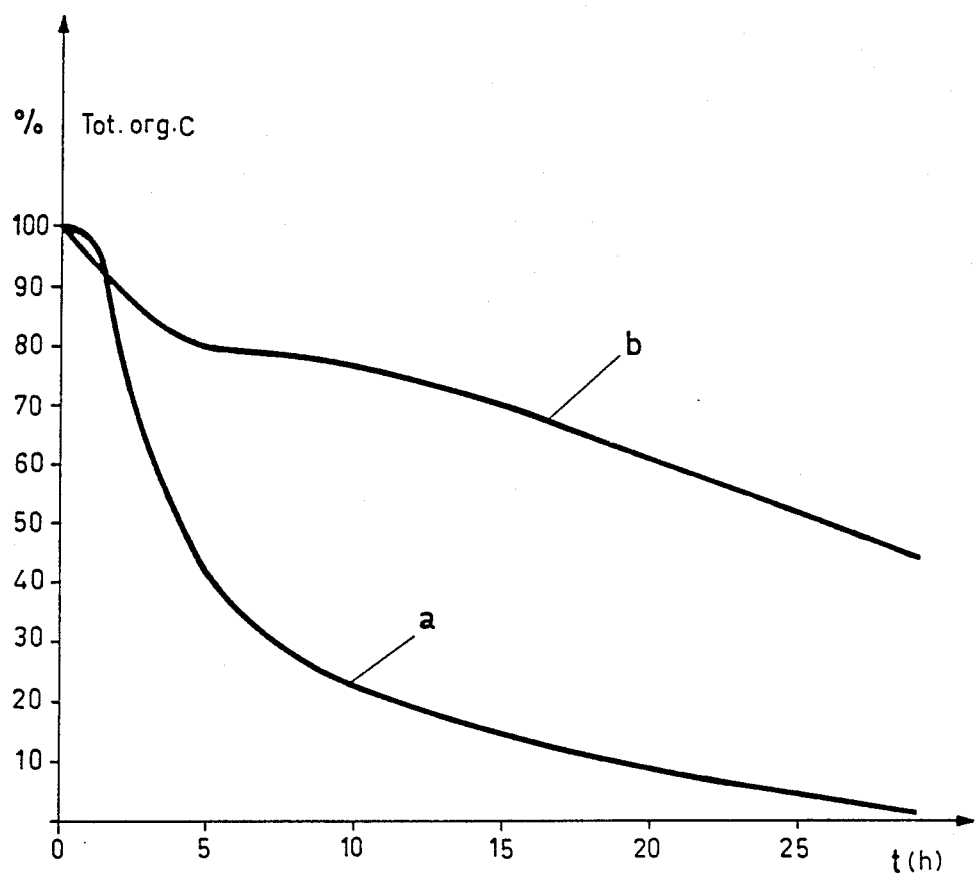

METHOD FOR PURIFYING INDUSTRIAL WASTE WATER BY DIRECT OXIDATION OF THE ORGANIC POLLUTANTS

TECHNICAL AREA

Purification of industrial waste water and degredation of organic pollutants in an electrochemical cell having high long-term stability.

The invention relates to an electrochemical method for the fastest and the most economical degradation possible of organic compounds present in waste water using electrodes with a high oxygen overvoltage.

In particular, it relates to a method for purifying industrial waste water by direct oxidation of the organic pollutants by means of electrochemical oxidation in a cell.

DESCRIPTION OF THE PRIOR ART

It is known to treat water by the action of oxidants. This also includes treatment of waste water using direct anodic oxidation in an electrochemical cell, the waste water or the aqueous solution of an organic pollutant to be degraded taking over the function of the electrolyte. An example is the treatment of cyanide solutions (cf. A. T. Kuhn, "The electrochemical treatment of aqueous effluent streams" in "Electrochemistry of cleaner environments", pp. 98–130, J. O'M. Bockris, Plenum Press, N.Y./London, 1972). High demands are not made on the electrode material since cyanide oxidation can be carried out even at relatively low redox potentials. This situation is different in the case of degradation-resistant organic compounds, the oxidation of which requires relatively high potentials. An essential condition here is the highest possible oxygen overvoltage at the anode. The water-oxidation intermediates to be formed on degradation of oxidation-resistant organic substances can be formed at the anode only using high oxygen overvoltages. This requires a specific anode material (cf. DE-A-No. 3,428,582). Here, $PbO_2$, above all, is proposed as the active layer of the anode.

However, $PbO_2$ anodes do not have the long-term corrosion resistance which is necessary for the intended purpose, and the corrosion products are extremely toxic, which cannot be tolerated in waste water.

Long-term stable anodes having the lowest possible noble-metal content play an important part in numerous industrial electrochemical processes. These anodes usually comprise a base made from a film-forming metal ("valve metal") such as titanium and an active surface coating of at least one noble metal, at least one noble metal oxide or a mixture of a noble metal oxide and an oxide of a film-forming metal, such as $TiO_2$.

Arranged in order of the oxygen overvoltage, the anodes generally used for the present purpose can be described as follows:

Anodes having a low oxygen overvoltage: These anodes have a comparatively high content of noble metals or noble metal oxides. The oxides of ruthenium and iridium, or mixtures thereof, still represent the best electrocatalysts in acidic or neutral media. This also applies to mixtures containing stabilizing additives of titanium oxide or tin oxide (cf. A. Nidola in S. Trasatti, Ed., Electrodes of Conductive Metal Oxides, Part B, pages 627–659, Elsevier Scientific Publ. Co., 1981).

Anodes having a moderate to high oxygen overvoltage: These anodes have a low noble-metal content since oxygen evolution as a competing reaction is suppressed in favor of evolution of another gas (for example chlorine). Complete omission of noble metals such as Pt, Pd, Ru and Ir is not possible since the overvoltage would otherwise be too high (cf. EP-A-No. 0,153,586; OE-A-No.3,103,168; DE-C-No.2,625,820).

Anodes having a very high oxygen overvoltage: These anodes either have a similar composition to the abovementioned or they comprise mainly or exclusively $PbO_2$ or graphite.

The anodes of the lastmentioned type leave something to be desired in operation since their long-term stability is inadequate. In addition, $PbO_2$ must be protected against cathodic polarization (cf. DE-A-No.3,432,684).

For electrochemical processes, in particular the decomposition of alkali metal chlorides, Sb-doped $SnO_2$ anodes have already been proposed (cf. DE-A-No.1,962,860). The active part was applied as a thin coating on a base of a film-forming metal (Ti, Zr, Nb, Ta or W) in the form of solutions, which were subsequently dried and heat-treated and thus converted into oxide mixtures.

There is, therefore, a great need for an improvement, electrochemical waste-water purification methods and for suitable electrodes which have an adequate long-term stability and achieve highest possible oxygen overvoltages in order that electrochemical processes which are known per se may be carried out more effectively.

DESCRIPTION OF THE INVENTION

The invention has the object of indicating a method for industrial purification of waste water by direct oxidation of the organic pollutants in an electrochemical cell, electrodes being proposed which, without using expensive noble metals, have a very high oxygen overvoltage which, if possible, is still above that of $PbO_2$. Furthermore, a high long-term stability both in operation and during shut-downs should be ensured. The construction of the electrodes used should be simple, require no additional measures for protection against cathodic polarization, and make possible a simple, reproiducible production procedure. The method should extend the applicability of such electrochemical processes and is suitable for the development of new processes.

This object is achieved in that, in the method mentioned initially, the anode used is an electrode which has a high oxygen overvoltage and which does not contain noble metals in any form nor $PbO_2$ nor graphite in its active part nor in any intermediate layer, and in that the active part comprises exclusively $SnO_2$ doped with F, Cl, Sb, Mo, W, Nb or Ta or with a mixture of at least two of the abovementioned elements.

METHOD OF CARRYING OUT THE INVENTION

The invention is described with reference to the method examples below, illustrated by a figure.

BRIEF DESCRIPTION OF THE DRAWING

The FIG. here shows a diagram of the decrease in total organic carbon as a function of time for an electrochemical process carried out in accordance with the method using a doped $SnO_2$ anode represented in comparison to a conventional method using a $PbO_2$ anode.

The electrolyte comprised a 0.5 normal aqueous $Na_2SO_4$ solution with which 10 ppm of benzoic acid $C_6H_5COOH$ was admixed. Pressure p=1 bar, temperature T=20° C.

The method essentially comprises using an optimum $SnO_2$ anode, which is why the production of the latter is described first:

EXAMPLE 1 FOR THE PRODUCTION OF AN $SnO_2$ ANODE

The base material used for an anode was titanium. A square titanium sheet of side length 10 mm and thickness 1 mm was degreased in Chlorothene and acetone and subsequently etched in boiling oxalic acid. The sheet was then placed on a hotplate and heated to a temperature of 450° C. The sheet was then sprayed with a 0.7 molar solution of anhydrous $SnCl_4$ in ethyl acetate by means of a spray pistol using nitrogen as transport agent (carrier gas) under a pressure of 0.5 bar. During this operation, the $SnCl_4$ decomposed in situ on the titanium sheet surface under the influence of atmospheric oxygen, and a coherent, $Cl^-$-doped $SnO_2$ film of thickness 0.32 $\mu$m was formed.

The titanium sheet covered with an $SnO_2$ surface coating was then employed in an electrochemical cell in which 350 ml of 1 normal $H_2SO_4$ was present as electrolyte. The oxygen overvoltage of the electrode was measured potentiostatically using standard three-electrode arrangement. The counterelectrode comprised a platinum sheet, and the reference electrode was a calibrated saturated calomel electrode. The experiments were carried out at a pressure of 1 bar and a temperature of 20° C. Under a current density of 0.1 mA/cm$^2$, the oxygen overvoltage compared to the reference electrode (voltage at commencement of $O_2$ evolution) was 1.87 V. The gradient from the Tafel formula (current density as a logarithmic function of the overvoltage) was about 130 mV/decade. For comparison, the oxygen overvoltage was determined at a Pt anode and a $PbO_2$ anode. Under otherwise identical operational conditions, it was 1.48 V and 1.65 V respectively (commencement voltage).

EXAMPLE B FOR THE PRODUCTION OF AN $SnO_2$ ANODE

As in Example A, the base material used for an anode was titanium. A rectangular titanium sheet of width 100 mm, length 200 mm and thickness 2.5 mm was degreased and pickled in accordance with Example A. A solution of 277 g of tin chloride hydrate $SnCl_4.5H_2O$, 29.7 g of $SbCl_3$ and 87 g of concentrated HCl in 2 L of n-butanol was then prepared in a shallow dish. The titanium sheet was dipped into this solution for 10 s, the excess solution was allowed to drip off, and the sheet was dried under an infra-red lamp. The sheet was subsequently heat-treated in air for 10 minutes at a temperature of 500° C. During this operation, the Sn and Sb salts were hydrolysed and converted into antimony-doped $SnO_2$. The dipping, drying and heat-treatment process was repeated a further 4 times, and the titanium sheet with coating was subsequently heat-treated for 1 hour at 500° C.

The $SnO_2$ electrode doped in this way with antimony was tested using the method given in Example A. An oxygen overvoltage (voltage at commencement of $O_2$ evolution) of 1.95 V was produced.

EXAMPLE C FOR THE PRODUCTION OF AN $SnO_2$ ANODE

Firstly, a solution of 260.5 g of $SnCl_4$ (corresponding to one gram-mole) and 400 ml of water was prepared in a beaker, and a 4% strength $NH_4OH$ solution was added dropwise to this solution with vigorous stirring until a colloidal precipitate of $SnO_2.nH_2O$ had formed and the supernatent solution had a pH of 3.5. The precipitate was centrifuged, the supernatent solution was decanted, and the precipitate was re-dispersed with 500 ml of water as wash liquid. This washing was repeated a total of 3 times, and the colloidal residue was finally dispersed a final time in 500 ml of water and subsequently peptized for 3 hours at a temperature of 40° C. with stirring. In this way, a milky-white sol of colloidal $SnO_2.nH_2O$ was obtained which still contained small amounts of $Cl^-$ ions. The desired dopes can be added as water-soluble organic salts to this sol. In the present case, 50 ml of a solution of antimony tartrate in water was prepared so that the content of $Sb^{3+}$ ions was 4.87 g (corresponding to about 0.04 gram-mole). This solution was added dropwise with vigorous stirring to the abovementioned milky-white $SnO_2$ sol.

The doped sol prepared in this way was then applied by spraying onto a titanium sheet, cleaned in accordance with Example 1, of width 40 mm, length 60 mm and thickness 1.2 mm. The coating was dried in air and heattreated for 5 minutes at a temperature of about 500° C. during this operation, the water was expelled and the doped $SnO_2$ remaining was baked firmly into the surface of the titanium sheet. This spraying, drying and baking process was repeated a further 4 times. The finished coating had an average thickness of 2 $\mu$m.

The $SnO_2$ electrode doped in this way with antimony was investigated by a measuring method given in Example A, an oxygen overvoltage (commencement voltage) of 1.9 V being measured.

EXAMPLE D FOR THE PRODUCTION OF AN $SnO_2$ ANODE

In accordance with Example C, a sol doped with $Sb^{3+}$ ions was prepared. This sol was sprayed in a conventional spray dryer to form a spherical powder of particle size 0.1 to 1 mm. The powder was heated to a temperature of 900° C. at a heating rate of 100° C./h, kept at this temperature for 2 hours and finally cooled to room temperature. From this fired powder, solid, compact ceramic elements were formed by sintering in the form of spheres, which were used as fixed-bed packing in an electrochemical reactor.

METHOD EXAMPLE 1

In order to carry out the method, anodes produced in accordance with Examples A to C and having a surface area of 1 dm$^2$ were installed in an electrochemical cell which contained as electrolyte a solution of 1 normal $H_2SO_4 + 10^{31\ 3}$ molar hydroquinone $C_6H_4(OH)_2$. The electrochemical parameters were determined potentiostatically during operation. At the same time, the hydroquinone was degraded by anodic oxidation. The current yield for the oxidation of hydroquinone below an overvoltage of 1.7 V was determined inter alia. Likewise, the overvoltage at the anode for a current yield of 90% was measured, ie. for the case where 90% of the current passed through the cell contribute to oxidation of hydroquinone and 10% to evolution of oxygen. The values were compared to those of known Pt and $PbO_2$ anodes under identical operational conditions and collated in the table below.

| Electrode | $SnO_2$ (Ex. A) | $SnO_2$ (Ex. B) | $SnO_2$ (Ex. C) | $PbO_2$ | Pt |
|---|---|---|---|---|---|
| Current yield (%) below 1.7 V | 99 | 99 | 99 | 91 | 50 |
| Overvoltage (V) at a current yield of 90% | 1.93 | 1.97 | 1.75 | 1.75 | 1.55 |

METHOD EXAMPLE 2

See Figure.

In order to carry out the method, an electrochemical cell was used which was fitted with the anode described below:

A square piece of expanded titanium metal of side length 50 mm and pore width 6 mm was pre-treated in accordance with Example A and provided with a Cl-doped $SnO_2$ surface coating. The finished electrode was employed as the anode in an undivided electrochemical cell which was used for anodic oxidation of benzoic acid $C_6H_5COOH$. The electrolyte comprised 0.5 normal $Na_2SO_4$ solution + 10 ppm of benzoic acid. The cathode used was a square piece of expanded titanium metal of the same size which was coated with platinum. A constant current of 100 mA (corresponding to a virtual current density of 2 mA/cm$^2$, relative to both sides of the anode) was applied to the electrochemical cell. The electrolyte was stirred during the entire duration of operation. The concentration of benzoic acid and the total organic carbon were determined continuously. For comparison, an experiment was carried out using a $PbO_2$ anode. The results are plotted in the Figure. Whereas the $PbO_2$ anode required a time of 24 hours for degradation of 10 ppm of benzoic acid to the value zero, the time for the $SnO_2$ anode was only 5 hours. Whereas the content of total organic carbon had fallen to half after 26 hours in the case of the $PbO_2$ anode, the $SnO_2$ anode only required about 4 hours to reach the same value.

METHOD EXAMPLE 3

In order to carry out the method, an anode produced in accordance with Example C, coated on one side and with a surface area on one side of 1 dm$^2$ was installed in an undivided electrochemical cell which was used for anodic oxidation of the organic dye Orange II. The electrolyte comprised 0.5 normal $Na_2SO_4$ solution + 1,150 mg/l of dye, the pH being adjusted to 12.5 by adding NaOH. The cathode used was a piece of expanded titanium metal of the same size which ws coated with platinum. A constant current of 1 A (corresponding to a current density of 10 mA/cm$^2$) was applied to the cell. The concentration of the dye and the total organic carbon were determined continuously. After 10 minutes, the dye concentration had dropped to 35% of the initial value, and it was completely degraded after 30 minutes. The concentration of total organic carbon had dropped to half the initial value after 1 hours, to 30% after 6 hours and to 6% after 10 hours.

METHOD EXAMPLE 4

In order to carry out the method, the same electrochemical cell as in Method Example 3 was used. The degradation of naphthalenesulfonic acid was investigated. The electrolyte comprised 0.5 normal $Na_2SO_4$ solution +400 ppm of naphthalenesulfonic acid and was adjusted to a pH of 12.5 by adding NaOH. The remaining operating parameters were the same as in Method Example 3. The concentration of naphthalenesulfonic acid had dropped to 30% of the initial value after 20 minutes, to 8% after 40 minutes and to 2% after 3 hours. The total carbon fell to half the initial value after 1 hour and to 15% after 3 1/2 hours.

METHOD EXAMPLE 5

In order to carry out the method, the same electrochemical cell as in Method Example 3 was used. The degradation of a waste water from dye manufacture (Messrs. Ciba-Geigy. Basle) was investigated. The waste water contained 865 mg/l of total organic carbon. The electrolyte was adjusted to a pH of 12.5 by adding NaOH. The remaining operating parameters corresponded to those of Method Example 3. The content of total organic carbon was determined as a function of the operating time of the electrochemical cell. The content had dropped to about 42% after 2 hours and to 9% after 8 hours.

In all comparison experiments, it was possible to determine that the $SnO_2$ anode in accordance with the new method is at least equal to conventional $PbO_2$ or Pt anodes with respect to oxygen overvoltage and suitability for anodic oxidation processes, but is clearly superior in some respects of operating behavior. The latter applies especially to the long-term stability and to insensitivity towards cathodic polarization.

The invention is not limited to the method examples. It should again be emphasized that the electrode in accordance with the new method does not contain noble metals in any form of arrangement—even as a component of a base or an intermediate layer or a protective layer. In addition, it is free of $PbO_2$ or graphite. The doping of $SnO_2$ in order to achieve the electroconductivity necessary is carried out using F or Cl in the form of anions or Sb, Mo, W, Nb or Ta in the form of cations. If the anode comprises not only its active part in the form of powder or in the form of a porous or dense, solid ceramic element, a base made from a film-forming metal such as Ti, Zr, Hf, Nb, Ta or W and having an $SnO_2$ surface coating in the form of a film or a pasty coating is used.

In all embodiments, the $SnO_2$ electrode in accordance with the new method achieves the oxygen overvoltage of a $PbO_2$ comparison electrodes. In a preferred embodiment, its $O_2$ $_2$ commencement voltage at a current density of 0.1 mA/cm$^2$ in 1 normal $H_2SO_4$ under a pressure of 1 bar and at a temperature of 20° C. in the presence of a Pt counterelectrode and a saturated calomel electrode reaches at least the value 1.60 V, preferably a value of 1.85 V.

We claim:

1. A method for purifying industrial waste water by direct oxidation of organic pollutants contained therein, which comprises electrochemically oxidizing said waste water in a cell, wherein an anode used is an electrode having a high oxygen overvoltage which does not contain noble metals in any form, nor $PbO_2$, nor graphite in its part, nor in an intermediate layer, and wherein an active outer coating of said anode in contact with said waste water consists of $SnO_2$ doped with an element selected from the group consisting of F, Cl, Sb, Mo, W, Nb and Ta or with a mixture of at least two of the above-mentioned elements.

2. The method as claimed in claim 1, wherein the oxygen overvoltage of the electrodes, measured under identical experimental conditions, is at least as high as that of a $PbO_2$ comparison electrode.

3. The method as claimed in claim 1, wherein the oxygen overvoltage of the electrode, measured as the $O_2$ commencement voltage at a current density of 0.1 $mA/cm^2$ in 1 normal $H_2SO_4$ under a pressure of 1 bar and at a temperature of 20° C. in the presence of a Pt counterelectrode and a saturated calomel electrode, reaches at least the value 1.60 V.

4. The method as claimed in claim 3, wherein the oxygen overvoltage of the electrode, measured as the $O_2$ commencement voltage at a current density of 0.1 $mA/cm^2$, reaches at least the value 1.85 V.

5. The method as claimed in claim 1, wherein the electrode comprises a base of Ti, Zr, Hf, Nb, Ta or W and a surface coating of doped $SnO_2$ as the active part in the form of a film or pasty or ceramic coating.

6. The method as claimed in claim 5, wherein said anode comprises an active outer coating of doped $SnO_2$ on a titanium base.

7. The method as claimed in claim 1, wherein the active outer coating of said electrode which consists of $SnO_2$ is in the form of a powder or a sintered porous ceramic element.

8. The method as claimed in claim 1, wherein said organic pollutants are oxidized on the surface of said anode.

9. The method as claimed in claim 1, wherein said active outer coating of said anode is a coating layer having a thickness of about 0.32 to 2 $\mu$m.

* * * * *